(12) United States Patent
Shimada et al.

(10) Patent No.: US 7,355,945 B2
(45) Date of Patent: Apr. 8, 2008

(54) OPTICAL PICKUP ADJUSTING APPARATUS AND ADJUSTING METHOD

(75) Inventors: Yutaka Shimada, Tokyo (JP); Hideo Nagasaka, Kanagawa (JP)

(73) Assignee: Sony Corporation (JP)

( * ) Notice: Subject to any disclaimer, the term of this patent is extended or adjusted under 35 U.S.C. 154(b) by 741 days.

(21) Appl. No.: 10/380,578

(22) PCT Filed: Jul. 16, 2002

(86) PCT No.: PCT/JP02/07216

§ 371 (c)(1),
(2), (4) Date: Mar. 14, 2003

(87) PCT Pub. No.: WO03/009283

PCT Pub. Date: Jan. 30, 2003

(65) Prior Publication Data

US 2003/0179673 A1    Sep. 25, 2003

(30) Foreign Application Priority Data

Jul. 17, 2001    (JP)    ............................ 2001-217366

(51) Int. Cl.
*G11B 7/08*    (2006.01)

(52) U.S. Cl. ................ 369/53.19; 369/44.14; 369/53.23; 369/94; 369/112.01

(58) Field of Classification Search ............. 369/13.01, 369/53.19, 53.22, 94, 44.13, 44.23, 44.35, 369/121, 275.1, 275.3, 283, 286, 44.21, 44.24, 369/44.38, 47.5, 47.52, 53.3, 53.34, 112.24, 369/44.32, 122, 44.37, 50.21, 50.23, 53.21, 369/53.23, 44.29, 84, 44.14, 44.26, 112.01; 372/50.124, 23, 96

See application file for complete search history.

(56) References Cited

U.S. PATENT DOCUMENTS 4,864,118 A * 9/1989 Opheij et al. ............ 369/44.14
5,828,648 A * 10/1998 Takasu et al. ............ 369/275.1
5,831,960 A * 11/1998 Jiang et al. ................. 369/121
5,892,739 A * 4/1999 DeCusatis et al. ....... 369/44.13
5,903,531 A * 5/1999 Satoh et al. ............. 369/44.29
5,986,998 A * 11/1999 Park ........................... 369/121
6,084,900 A * 7/2000 Claisse et al. ......... 372/50.124
6,137,766 A * 10/2000 Utsumi ..................... 369/275.1
6,343,060 B1 * 1/2002 Ko ........................... 369/275.1
6,590,856 B2 * 7/2003 Tsukagoshi et al. ...... 369/275.3
6,628,591 B1 * 9/2003 Yokota et al. ............ 369/53.21

(Continued)

FOREIGN PATENT DOCUMENTS

JP    1069647 A    3/1998

(Continued)

*Primary Examiner*—Hoa T. Nguyen
*Assistant Examiner*—Kim-Kwok Chu
(74) *Attorney, Agent, or Firm*—Lerner, David, Littenberg, Krumholz & Mentlik, LLP

(57) ABSTRACT

An adjustment apparatus for adjusting an optical pickup capable of recording and/or reproducing optical discs of different sorts. The adjustment apparatus is an adjustment optical disc having a first signal recording layer of a physical format in common with a CD and a second signal recording layer of a physical format in common with a DVD. On the first and second signal recording layers, there are concentrically recorded EFM modulated data. The respective signal recording layers are provided with recording areas that are not overlapped with each other.

16 Claims, 3 Drawing Sheets

U.S. PATENT DOCUMENTS 6,633,535 B1 * 10/2003 Asada .................... 369/286
6,678,237 B1 * 1/2004 Edwards et al. ............ 369/286
6,700,845 B1 * 3/2004 Sako et al. .............. 369/53.22
6,826,139 B1 * 11/2004 Oh et al. ................ 369/53.37
2002/0060958 A1 * 5/2002 Ando et al. .............. 369/44.23

FOREIGN PATENT DOCUMENTS

JP         2001-43574 A       2/2001

* cited by examiner

OPTICAL PICKUP ADJUSTING APPARATUS AND ADJUSTING METHOD

TECHNICAL FIELD

The present invention relates to an optical disc for adjustment usable for adjusting an optical pickup capable of recording and/or reproducing plural sorts of the optical discs, an adjustment apparatus for an optical pickup, and to a method for adjusting an optical pickup.

BACKGROUND ART

Among various optical pickups of different sorts, there is such a one which is capable of recording and/or reproducing two sorts of the optical discs of different physical formats, such as a Compact Disc (CD) and a Digital Versatile Disc (DVD). An optical pickup capable of recording and/or reproducing these two sorts of the optical discs is provided with a light source for radiating a light beam for CD, having a wavelength of 780 nm, and a light beam for DVD, having a wavelength of 635 to 650 nm, a double focal point type objective lens for condensing the light beam radiated from the light source, a photodetector for detecting the return light beam reflected back from the signal recording surface of the CD or the DVD, and an objective lens driving unit for driving the objective lens into displacement in the focussing and tracking directions.

The objective lens driving unit is provided with a lens holder for holding the objective lens, a holder supporting member for supporting the lens holder by a resilient supporting member for displacement in the focussing and tracking directions, a focussing driving unit for actuating the lens holder holding the objective lens in the focussing direction, and a tracking driving unit for actuating the lens holder holding the objective lens in the tracking direction.

The focussing driving unit is provided with a focussing coil and a focussing magnet, and actuates the lens holder, held by the resilient supporting member, into displacement along the focussing direction, which is the direction of the optical axis of the objective lens, under the action of the current flowing through the focussing coil and the magnetic field generated by the focussing magnet. The tracking driving unit is made up by a tracking coil and a tracking magnet, and actuates the lens holder, carried by the resilient supporting member, into displacement along the direction perpendicular to the optical axis of the objective lens, under the action of the current flowing through the tracking coil and the magnetic field generated by the tracking magnet.

With the above-described optical pickup, the objective lens is actuated by the focussing driving unit into displacement for focussing the light beam radiated from the light source on the signal recording surface of the optical disc. The objective lens is actuated by the focussing driving unit into displacement for focussing the light beam radiated from the light source on the signal recording surface of the optical disc. By actuating the objective lens by the tracking driving unit into displacement in the tracking direction, the light beam is scanned to read out information signals recorded on the CD or on the DVD.

The optical pickup is further mounted on a base unit adapted to be mounted to the recording and/or reproducing apparatus. This base unit includes a base mounted to a casing of a recording and/or reproducing apparatus. The base, in turn, includes a slide member, on which the optical pickup is mounted, a feed unit for advancing the slide member, on which the optical pickup is mounted, along the radius of the optical disc, and a disc rotating actuating unit for rotationally driving the optical disc.

Meanwhile, the optical pickup, assembled in the assembling step, is adjusted as to the relative positions between the objective lens and the light source and as to tilt of the optical axis of the objective lens. This adjustment is carried out after mounting the optical pickup, such as after mounting the optical pickup to the base unit. In this case, the relative positions between the objective lens and the light source and the tilt of the optical axis of the objective lens can be adjusted without dependency on the mounting precision of the optical pickup to the base unit, in contradistinction from the case of carrying out the adjustment before mounting the optical pickup to the base unit.

This adjustment is carried out for each of the CD and the DVD. Specifically, the optical disc for CD adjustment is loaded on the disc rotating actuating unit and run in rotation for adjusting the relative positions between the objective lens and the light source for optimizing the optical characteristics. The optical disc for DVD adjustment then is mounted on the disc rotating actuating unit and is run in rotation for adjusting the relative positions between the objective lens and the light source for optimizing the optical characteristics. Subsequently, the tilt of the objective lens is adjusted, using the optical disc for DVD adjustment.

It should be noted that the optical disc for CD adjustment has 8-14 modulated data spirally recorded thereon, in accordance with the same physical format as that for the CD, while the optical disc for DVD adjustment has 8-16 modulated data spirally recorded thereon in accordance with the same physical format as that for the DVD, that is with a physical format for recording to a higher density than with the physical format for the CD.

In making adjustments of the optical pickup used for recording and/or reproduction of two optical discs, that is CD and DVD, it is necessary to get the optical pickup for CD adjustment mounted on the disc rotating actuating unit, when adjusting the optical characteristics for reproducing the CD, while it is necessary to get the optical pickup for DVD adjustment mounted on the disc rotating actuating unit, when adjusting the optical characteristics for reproducing the DVD. In making these adjustments, the operations of exchanging the optical disc for adjustment is necessitated, with the consequence that it is difficult to attempt to improve the efficiency of the optical pickup adjustment operation further.

Moreover, these adjustments are carried out as the light source or the optical system is held by the light source adjustment unit of the adjustment apparatus in such a state that the slide member for advancing the optical pickup and the lens holder for holding the objective lens or the holder supporting member are held to high accuracy At this time, the slide member, holder supporting member and the light source are held separately, and are moved relative to one another in only a minor quantity for making the adjustments, so that, if the optical pickup in its entirety is advanced across the inner and outer rims of the optical disc for adjustment, difficulties are encountered in making the above adjustments.

In any of the above-described optical discs for adjustment, data are recorded spirally. Thus, if, as the optical disc for adjustment is kept in rotation, data is to be read out from the recording track of the optical disc for adjustment, the objective lens is moved gradually towards the outer rim of the disc simultaneously with rotation of the optical disc for adjustment. Thus, during adjustment, the objective lens of the optical pickup is moved towards the outer rim of the optical disc for adjustment, with the objective lens being moved from the zero viewing field swing state to the viewing field swing state, with the consequence that the optical axis of the objective lens is offset relative to the optical design center, such as the center of the light source, referred to below as the optical center. With this adjustment method, offsetting of the optical axis of the objective lens from the optical center leads to deteriorated optical characteristics and to deteriorated jitter of detected replay signals. Thus, in case changes in the reproduction signals are measured by tilting the optical axis of the objective lens to measure changes in the reproduced signals to adjust the tilt of the optical axis of the objective lens to an optimum point, considerable difficulties are encountered in making such adjustments.

For overcoming this deficiency, there is known such a method in which, when the optical axis of the objective lens has become offset a preset amount relative to the optical center, the feed unit is actuated to disengage the tracking servo to perform feed movement of the objective lens by a distance corresponding to the offset towards the inner rim of the optical disc to get the optical axis of the objective lens located within a predetermined offset at all times relative to the optical center. This feed movement is termed below a track jump.

In this method, since the optical axis of the objective lens and the optical center are moved at all times, it is difficult to detect real values during adjustment. Moreover, in this method, the time until tracking servo is in operation is short, while it takes time until stable real values are measured by a measurement unit, such as a jitter detector. Consequently, the time within which the position of the optical axis of the objective lens can be adjusted after track jump becomes very short, with the consequence that considerable difficulties are again encountered in making the adjustments Moreover, if, with the present method, the track jump interval is increased, the position offset of the optical axis of the objective lens is increased further.

In addition, since the data read out from the optical disc for CD adjustment is 8-14 modulated data, while the data read out from the optical disc for DVD adjustment is 8-16 modulated data, the adjustment apparatus needs to be provided with a signal processing circuit including the two modulating circuits, thus complicating the structure of the reproduction system.

DISCLOSURE OF THE INVENTION

In view of the above-depicted status of the art, it is an object of the present invention to provide a method and an apparatus for adjusting an optical pickup whereby it is possible to simplify and expedite adjustment of the optical pickup capable of recording and/or reproducing optical discs of different sorts.

It is another object of the present invention to provide an optical disc for adjustment whereby it is possible to simplify the structure of the adjustment apparatus.

The present invention provides an adjustment apparatus for an optical pickup including a disc rotating unit for mounting thereon and for rotationally driving an optical disc for adjustment, the optical disc for adjustment being adapted for adjusting an optical pickup, the optical disc for adjustment having at least two signal recording layers, there being concentrically recorded in the respective signal recording layers data modulated in accordance with the same modulation system but with respective different physical formats, with the optical pickup being configured for collecting a light beam, radiated from a light source, with an objective lens, and for detecting the return light beam reflected back from the optical disc for adjustment by a photodetector. The optical pickup displaces the objective lens, by an objective lens driving unit, in a direction along the optical axis of the objective lens and in a direction perpendicular to the optical axis. The adjustment apparatus for an optical pickup also includes adjustment means for adjusting the relative positions of the light source and the objective lens and the tilt of the optical axis of the objective lens. The adjustment means illuminates the light beam to one of the signal recording layers of the optical disc for adjustment, in a preset position relative to the optical disc for adjustment, for adjusting the relative positions of the light source and the objective lens. The objective lens driving unit displaces the objective lens along the optical axis thereof by the objective lens driving unit. The light beam is illuminated on another signal recording layer of the optical disc for adjustment in order to adjust the relative positions between the light source and the objective lens.

The present invention also provides an adjustment method for an optical pickup adjustment apparatus including a disc rotating unit for mounting thereon and for rotationally driving an optical disc for adjustment, the optical disc for adjustment being adapted for adjusting an optical pickup, the optical disc for adjustment having at least two signal recording layers, there being concentrically recorded in the respective signal recording layers data modulated in accordance with the same modulation system but with respective different physical formats, and the optical pickup for collecting a light beam radiated from a light source with an objective lens and for detecting the return light beam reflected back from the optical disc for adjustment by a photodetector. The optical pickup displaces the objective lens, by an objective lens driving unit, in a direction along the optical axis thereof and in a direction perpendicular to the optical axis. The adjustment method includes illuminating the light beam to one of the signal recording layers of the optical disc for adjustment, in a preset position relative to the optical disc for adjustment, for adjusting the relative positions of the light source and the objective lens, and displacing the objective lens along the optical axis of the objective lens by the objective lens driving unit. The light beam is illuminated on the other signal recording layer of the optical disc for adjustment in order to adjust the relative positions between the light source and the objective lens.

The present invention also provides an apparatus for adjusting an optical pickup including an optical pickup having a light source for radiating a light beam of a first wavelength and a light beam of a second wavelength, an objective lens for collecting and radiating the light beam for an optical disc for adjustment having tracks formed concentrically in at least two layers based on signals modulated in accordance with the same modulation system, but with respective different physical formats, a photodetector for detecting the reflected light from the optical disc for adjustment of the illuminated light beam, and a driving unit for actuating the objective lens in the focussing direction and in the tracking direction in a controlled manner, and an adjustment unit for adjusting the relative positions of the light source and the objective lens and the tilt of the optical axis of the objective lens. The adjustment unit performs a first adjustment for adjusting the relative positions of the light source and the objective lens when the light beam of the first wavelength is illuminated on one of the signal recording layers of the optical disc for adjustment and focussing control is performed by the driving unit. The adjustment unit also performs a second adjustment for adjusting the relative positions of the light source and the objective lens when the light beam of the second wavelength is illuminated on the other of the signal recording layers of the optical disc for adjustment and focussing control is performed by the driving unit The present invention also provides an optical disc for adjustment of an optical pickup having at least two signal recording layers, in which, on the respective signal recording layers, there are concentrically recorded data modulated in accordance with the same modulation system but with respective different physical formats.

In this optical disc for adjustment of an optical pickup, data modulated in accordance with the same modulation system as that of the first optical disc are recorded on one of the signal recording layers in accordance with the same physical format as that of the first optical disc, whereas, on another of the signal recording layers, the data modulated in accordance with the first modulation system are recorded with the same second physical format as that of the second optical disc on which second modulated data are recorded. The first modulation system employs post-modulation pits smaller in number than those employed in the second modulation system.

Other objects, features and advantages of the present invention will become more apparent from reading the embodiments of the present invention as shown in the drawings.

BEST MODE FOR CARRYING OUT THE INVENTION

Figure 1:
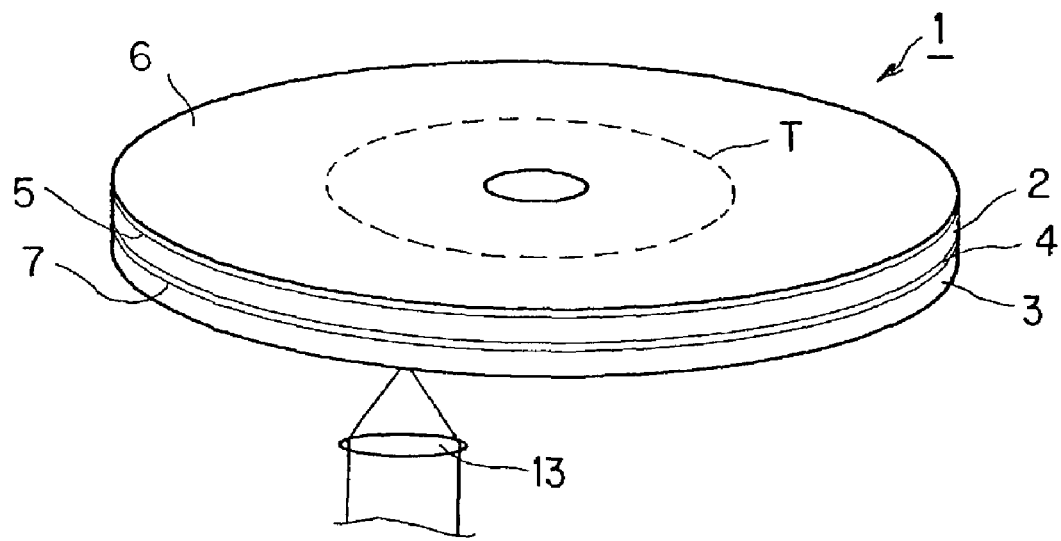
FIG. 1 is a perspective view showing an optical disc used for adjusting an optical pickup embodying the present invention.

Referring to the drawings, an optical disc 1 for adjusting an optical pickup embodying the present invention, an apparatus for adjusting an optical pickup employing this adjustment optical disc, and a method for adjusting the optical pickup employing this adjustment apparatus, are hereinafter explained in detail.

Referring to FIG. 1, the optical disc 1 for adjusting the optical pickup is an adjustment optical disc used for adjusting an optical pickup capable of reproducing both a CD and a DVD, and is formed by bonding together a light-transmitting first disc substrate 2 and a light-transmitting second disc substrate 3, each with a thickness of 0.6 mm, with a light-transmitting adhesive 4 in-between.

On one surface of the first disc substrate 2 is formed a first signal recording layer 5. This first signal recording layer 5 is used for adjusting the optical pickup in reproducing a CD.

Thus, the first signal recording layer 5 is provided at a distance of 1.2 mm from the signal readout surface in order that the physical format thereof will be the same as that for the CD. On the first signal recording layer 5, the data modulated in accordance with the same modulation system as that for a CD, that is, 8-14 modulated data, are recorded in a pit pattern with a track pitch of 1.6 μm and a pit length of 0.9 to 3.3 μm. It should be noted that, in contradistinction from the recording track of a routine optical disc, which is formed extending spirally from the inner rim towards the outer rim, a recording track T on the first signal recording layer 5 is formed concentrically to prevent the optical pickup from being moved radially during adjustment of the optical pickup. Meanwhile, a reflection film, a protection film or the like is formed on the first signal recording layer 5, and a label 6 is provided on the protective film.

A second signal recording layer 7 is provided on one surface of the second disc substrate 3. This second signal recording layer 7, used in adjusting the optical pickup in reproducing a DVD, is provided at a distance of 0.6 mm from the signal readout surface in order that the physical format thereof will be the same as that for the DVD. On the second signal recording layer 7, data modulated in accordance with the same modulation system as that for a CD, that is, 8-14 modulated data, are recorded in a pit pattern with a track pitch of 0.74 μm and a pit length of 0.4 to 1.87 μm. Intrinsically, the DVD uses a modulation system different from that for a CD, specifically, an 8-16 modulation system. However, since the optical disc for adjustment 1 is an optical disc for adjusting the optical pickup, it is basically unnecessary to demodulate data, and hence the 8-14 modulated data similar to those recorded on the CD are recorded on the second signal recording layer 7. That is, the optical disc for adjustment 1 uses the modulation system with a smaller number of pits following the modulation, that is 8-14 modulation, to relieve the load e.g., of the modulation processing. The recording track T provided on the second signal recording layer 7, is formed concentrically to prevent the optical pickup from being moved radially during adjustment of the optical pickup, in contradistinction from the recording track of a routine optical disc, which is formed extending spirally from the inner rim towards the outer rim.

Since data for adjustment are processed in keeping with the CD standard and recorded in this form on the first and second signal recording layers 5, 7, it is possible to append the Cross Interleave Reed-Solomon Code (CIRC) as the error correction code to the data for adjustment. As the error correction code, it is also possible to append the Reed Solomon Product Code (RS-PC) used in DVD.

Figure 2:
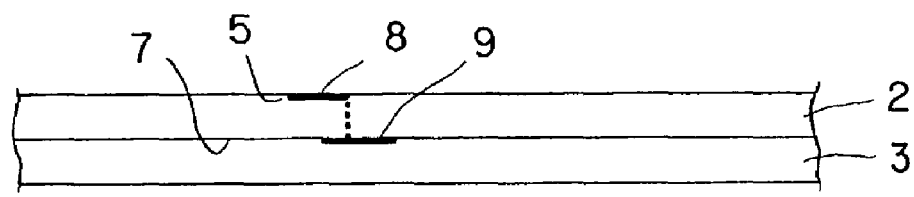
FIG. 2 is a cross-sectional view of an optical disc for adjustment in which the first recording area of the first signal recording layer is partially overlapped with the second recording area of the second signal recording layer.

It should be noted that, in the optical disc for adjustment 1, shown in FIG. 2, a first recording area 8 for adjustment data, recorded on the first signal recording layer 5, and a second recording area 9 for adjustment data, recorded on the second signal recording layer 7, are provided so that at least portions thereof will overlap with each other. That is, in the optical disc for adjustment 1, the first recording area 8 and the second recording area 9 are provided within a range which allows for follow-up by tracking control of the objective lens. For example, in the optical disc for adjustment 1, the recording area which is to be read out first may be provided closer to the inner rim of the optical disc for adjustment 1 than the other recording area and may have its trailing end overlapped at least with the leading end of the other recording area. Alternatively, the two recording areas may be overlapped completely with each other. That is, with the optical disc for adjustment 1, in which at least portions of the first recording area 8 and the second recording area 9 are overlapped with each other, it becomes unnecessary to advance the optical pickup by feed movement in switching the signal recording layers to be reproduced, thus allowing for efficient adjustment of the optical pickup.

Figure 3:
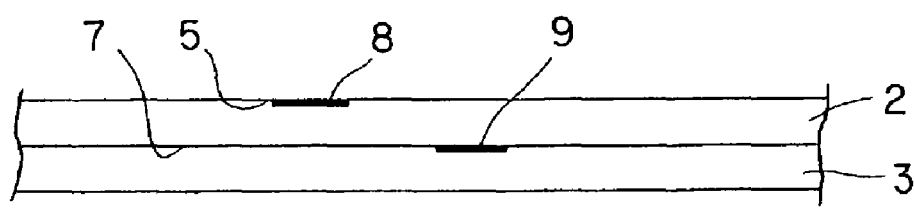
FIG. 3 is a cross-sectional view showing an optical disc for adjustment in which the first recording area of the first signal recording layer is not partially overlapped with the second recording area of the second signal recording layer.

The first recording area 8 and the second recording area 9, provided on the optical disc for adjustment 1, may also be provided so as not to overlap with each other, as shown in FIG. 3. In this case, the recording track provided on the first signal recording layer 5 is not overlapped with the recording track provided on the second signal recording layer 7, so that data may be read out reliably when reproducing the first recording area 8 of the first signal recording layer 5, as an example.

Thus, with the optical disc for adjustment 1, in which the recording tracks formed on the first signal recording layer 5 and the second signal recording layer 7 are provided concentrically, it becomes unnecessary to cause movement of the optical pickup along the radius of the optical disc for adjustment 1 when at least one of the signal recording layers is being reproduced, thus enabling efficient adjustment of the optical pickup. Moreover, with the optical disc for adjustment 1, since data for adjustment of the same modulation system are recorded in the first signal recording layer 5 and in the second signal recording layer 7, a signal processing circuit of for example a demodulation circuit of the adjustment apparatus may be used in common. In addition, since the 8-14 modulation system is used, it is possible to relieve the load incurred in e.g., demodulating the 8-16 modulated data.

The structure of the optical pickup, usable for recording and/or reproducing a CD or a DVD in the present invention, is now explained with reference to FIG. 4.

Figure 4:
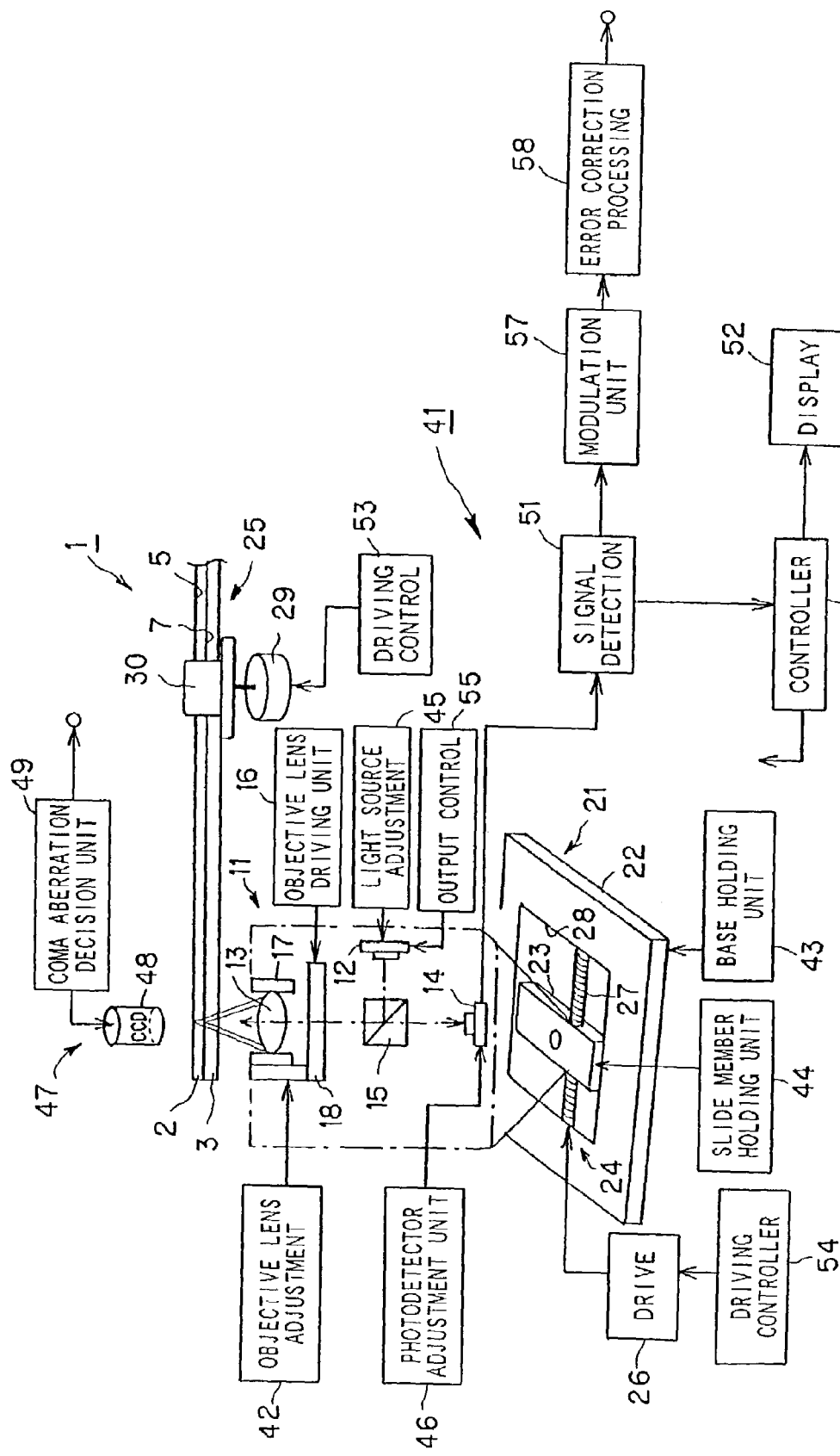
FIG. 4 illustrates the structure of the optical pickup adjustment apparatus.

This optical pickup 11, shown in FIG. 4, includes a light source 12 for e.g., a semiconductor laser, adapted for generating a light beam for a CD of a wavelength of 780 nm and a light beam for a DVD of a wavelength of 635 to 650 nm, a double focal point type objective lens 13 for condensing the light beams, radiated from the light source 12, onto the first signal recording layer 5 and the second signal recording layer 7 of the optical disc for adjustment 1, and a photodetector 14 for receiving the return light beam reflected back from the optical disc for adjustment 1. The optical pickup also includes a beam splitter 15 for routing the return light beam, reflected back from the optical disc for adjustment 1, to the photodetector 14, and an objective lens driving unit 16 for driving the objective lens 13 into displacement in the focussing and tracking directions.

The objective lens 13 includes e.g., a hologram unified to a lens, and is adapted for focussing the transmitted light on the first signal recording layer 5 when the CD is to be reproduced, that is when the light beam is to be illuminated on the first signal recording layer 5, while focussing the transmitted light on the second signal recording layer 7 when the DVD is to be reproduced, that is when the light beam is to be illuminated on the second signal recording layer 7. This objective lens 13 is held by a lens holder 17, which lens holder 17 is mounted via a resilient supporting member, not shown, to a holder supporting member 18. By supporting the lens holder 17, holding the objective lens 13, by the resilient supporting member, the lens holder 17 may be supported by the holder supporting member 18 as the lens holder 17 can be displaced in the focussing direction along the optical axis of the objective lens 13 and in the tracking direction perpendicular to the optical axis of the objective lens 13.

The objective lens driving unit 16 is made up by a focussing driving unit, for driving the objective lens 13 into displacement along the focussing direction, and a tracking driving unit for driving the objective lens 13 along the tracking direction. The respective driving units are each provided with a coil mounted to the lens holder 17 and a magnet mounted to the holder supporting member 18. Each driving unit drives the objective lens 13, held by the lens holder 17, into displacement in the focussing direction and in the tracking direction, by the interaction of the current flowing through the coil and the magnetic field generated by the magnet. Thus, the light beam radiated from the light source 12 is scanned by e.g., the objective lens driving unit 16 and is focussed on the signal recording layers of the CD or the DVD. The return light beam, reflected by the signal recording layer, is detected by the photodetector 14 to provide for reliable readout of the information signals.

The optical pickup 11, arranged as described above, is further mounted on a base unit 21 adapted to be mounted to a recording and/or reproducing apparatus. This base unit 21 includes a base 22 adapted to be assembled to a casing of the recording and/or reproducing apparatus. There are further provided on this base 22 a slide member 23 on which is assembled the optical pickup 11, a feed unit 24 for advancing the slide member 23, carrying the optical pickup 11, along the radius of the optical disc, and a disc rotation driving unit 25 for rotationally driving the optical disc.

The slide member 23, on which is mounted the optical pickup 11, is mounted in an aperture 28 formed in the base 22 for extending along the radius of the optical disc. The slide member 23 includes a positioning pin, not shown, engaged in a positioning opening, not shown, provided in the holder supporting member 18. This holder supporting member 18, forming the optical pickup 11, is secured with an adhesive in position to high accuracy.

The feed unit 24 includes a driving motor 26, mounted to the base 22, and a feed screw 27 connected to the driving motor 26 via a gearing composed of plural gears. The feed screw 27 is mounted for rotation to the base 22 for extending along the direction of movement of the optical pickup 11, that is along the radial direction of the optical disc. The feed screw 27 includes a screw thread formed in its peripheral surface and which is engaged by an engagement projection of the slide member 23 carrying the optical pickup 11. Thus, as the feed screw 27 is run in rotation by the driving motor 26, the slide member 23, carrying the optical pickup 11, is moved along the radius of the optical disc.

The disc rotation driving unit 25 includes a driving motor 29, mounted on the back side of the base 22, and a disc table 30, mounted on the driving shaft of the driving motor 29. The disc table 30 is engaged in a center opening of the optical disc for centering the optical disc for rotating the optical disc in unison therewith. The driving motor 29 causes rotation of a DVD, during reproduction of the DVD, so that the linear velocity will be e.g., 3.49 m/sec as provided in the DVD standard, while causing rotation of a CD, during reproduction of the CD, so that the linear velocity will be e.g., 1.2 to 1.4 m/sec as provided in the CD standard.

It is noted that, in an adjustment mechanism 41, responsible for adjustment of the optical pickup 11, assembled to the base unit 21, the base unit 21, comprised of the optical pickup 11, is held in position on an adjustment base block, not shown, as shown in FIG. 4. This adjustment mechanism 41 includes an objective lens adjustment unit 42 for holding the holder supporting member 18 of the optical pickup 11 and for adjusting the position of the objective lens 13, a base holding unit 43 for holding the base 22, a slide member holding unit 44 for holding the slide member 23, a light source adjustment unit 45 for holding and adjusting the position of the light source 12, a photodetector adjustment unit 46 for holding and for adjusting the position of the photodetector 14, and a detection unit 47 for detecting optical characteristics of the light beam radiated from the light source 12.

The adjustment base block, holding the base unit 21, includes a plural number of upstanding positioning shafts for positioning the base 22. These positioning shafts are engaged in positioning openings formed in the base 22 for holding the base 22 in position.

The objective lens adjustment unit 42 includes a pair of holding arms adapted for holding the holder supporting member 18. In adjustment, the objective lens adjustment unit 42 holds the holder supporting member 18 by the paired holding arms. These paired holding arms, holding the holder supporting member 18, cause translational movements of the holder supporting member 18 in a radial direction (X-direction) parallel to the radial direction of the optical disc for adjustment 1 and in a tangential direction (Y-direction) perpendicular thereto. The paired holding arms, holding the holder supporting member 18, perform adjustment of the radial skew of tilting the objective lens 13 radially of the optical axis, while performing tangential skew of tilting the objective lens 13 in a tangential direction relative to the optical axis. The paired holding arms cause movement of the objective lens 13 along the optical axis for adjusting the optical path length from the light source 12 to the optical disc for adjustment 1. Thus, by the paired holding arms, the holder supporting member 18 performs high-precision adjustment of the planar plane direction parallel to the optical disc for adjustment 1, the optical axis direction of the objective lens 13 extending at right angles to the planar plane direction and tilt of the objective lens 13. At this time, the holder supporting member 18 is slightly floated relative to the slide member 23. An adhesive is charged into a gap defined between the slide member 23 and the holder supporting member 18, whereby the holder supporting member 18 is secured as it is positioned highly accurately relative to the slide member 23.

The base holding unit 43 includes a pair of holding arms adapted for holding the feed screw 27 forming the feed unit 24 provided on the base 22. In adjusting the optical pickup, the paired holding arms hold both ends of the feed screw 27 such as to prevent flexural deformation of the feed screw 27 and such as to prevent excursions of the adjusted position of the optical pickup 11.

The slide member holding unit 44 includes a plural number of positioning pins for preventing movement of the slide member 23 along the feed screw 27. During adjustment of the optical pickup 11, these positioning pins are engaged in positioning openings formed in the slide member 23 to hold the slide member 23 in position along the radius of the optical disc for adjustment 1.

The light source adjustment unit 45 includes a light source holding arm, not shown, for holding the light source 12 provided within the optical pickup 11. During adjustment of the optical pickup 11, the light source holding arm holds the light source 12 in position to cause movement of the light source 12 for bringing the center of the light source into coincidence with an unmovable point on the optical axis of the objective lens 13. Moreover, the light source holding arm causes rotation of the light source 12 about the light emission point of the light source 12 as the center of rotation. In addition, the light source holding arm is moved along the optical axis of the objective lens 13 for adjusting the optical path length from the light source 12 to the optical disc for adjustment 1.

The photodetector adjustment unit 46 includes a photodetector holding arm for holding the photodetector 14 arranged within the optical pickup 11. During adjustment of the optical pickup 11, the photodetector holding arm holds the photodetector 14 in position and causes the photodetector 14 to be moved so that the center of the photodetector 14 will be coincident with an unmovable point on the optical axis of the objective lens 13. The photodetector holding arm causes rotation of the photodetector 14, while causing the photodetector 14 to be moved along the optical axis for adjusting the optical path length.

The detection unit 47 includes a CCD (Charge-Coupled Devices) camera 48 for detecting the light beam for detecting the light beam radiated from the objective lens 13, and a coma aberration decision unit 49 for detecting the coma aberration. The CCD camera 48 is positioned on the optical axis of the objective lens 13 by a movement unit, not shown, to output the detected result to the coma aberration decision unit 49. This coma aberration decision unit 49 detects the least value of the coma aberration.

Referring to FIG. 4, the adjustment mechanism 41 includes a signal detection unit 51 for detecting replay signals output from the photodetector 14 of the optical pickup 11, a display unit 52 for demonstrating the signals detected by this signal detection unit 51, a driving controller 53 for controlling the driving motor 29, forming the disc rotation driving unit 25, a driving controller 54 for controlling the driving motor 29 forming the feed unit 24 for the optical pickup 11, an output controller 55 for controlling the output of the light beam of the light source 12 and a controller 56 for controlling the overall operation. The controller 56 controls the driving controllers 53, 54, output controller 55, objective lens adjustment unit 42, light source adjustment unit 45 and the photodetector adjustment unit 46, based on the results of decision from the coma aberration decision unit 49 and on the input from the signal detection unit 51.

The adjustment mechanism 41 also includes a demodulating unit 57 for demodulating the signals detected by the signal detection unit 51, and an error correction unit 58 for correcting the demodulated data for errors. As the adjustment mechanism 41, the optical disc for adjustment 1, shown in FIGS. 1 to 3, is used. In the first signal recording layer 5 and the second signal recording layer 7 of the optical disc for adjustment 1, there are recorded data for adjustment, having the CIRC appended thereto as the error correction code, in accordance with the 8-14 modulation system. That is, in the first signal recording layer 5 and the second signal recording layer 7, there are recorded data modulated in accordance with the same modulation system and processed with error correction coding of the same system. Consequently, the demodulating unit 57 demodulates 8-14 modulated data read out from the first signal recording layer 5 and the second signal recording layer 7, while the error correction unit 58 executes error correction based on the CIRC of the demodulated data. The error correction unit 58 outputs the result to for example an inspection device adapted for inspecting an error rate. That is, in the adjustment mechanism 41, it is unnecessary to provide a demodulating unit for demodulating the 8-16 modulated data for DVD or an error correction unit for error correction decoding of RS-PC.

The method for adjusting, by the above-described adjustment mechanism 41 for the optical pickup 11 and the optical disc for adjustment 1, the relative positions between the light source 12 and the objective lens 13 of the optical pickup 11 as well as the position and the tilt of the objective lens 13 relative to the optical axis, is hereinafter explained.

First, the base unit 21 is set on the adjustment base block. The base unit 21 at this time has its positioning shafts engaged in the positioning openings provided in them base 22 and is thereby held in position on the adjustment base block highly accurately. The slide member holding unit 44 has its positioning pins engaged in the positioning openings provided in the slide member 23 for thereby holding the slide member 23 at a preset radial position on the optical disc for adjustment 1 highly accurately. The base holding unit 43 holds the feed screw 27 by the paired holding arms against rotation to prevent the optical pickup 11 from being incidentally deviated from the adjusted position. The optical pickup 11 is combined with the adjustment mechanism 41 by being set on the slide member 23 mounted on the base 22 for movement by means of the feed screw 27.

The holder supporting member 18 of the optical pickup 11, as set on the slide member 23, is held by the paired holding arm of the objective lens adjustment unit 42, whereby the objective lens 13 is three-dimensionally positioned relative to the slide member 23. The light source 12 is held by the light source holding arm forming the light source adjustment unit 45. The photodetector 14 is held by the photodetector holding aim forming a light receiving unit holder 46.

Figure 5:
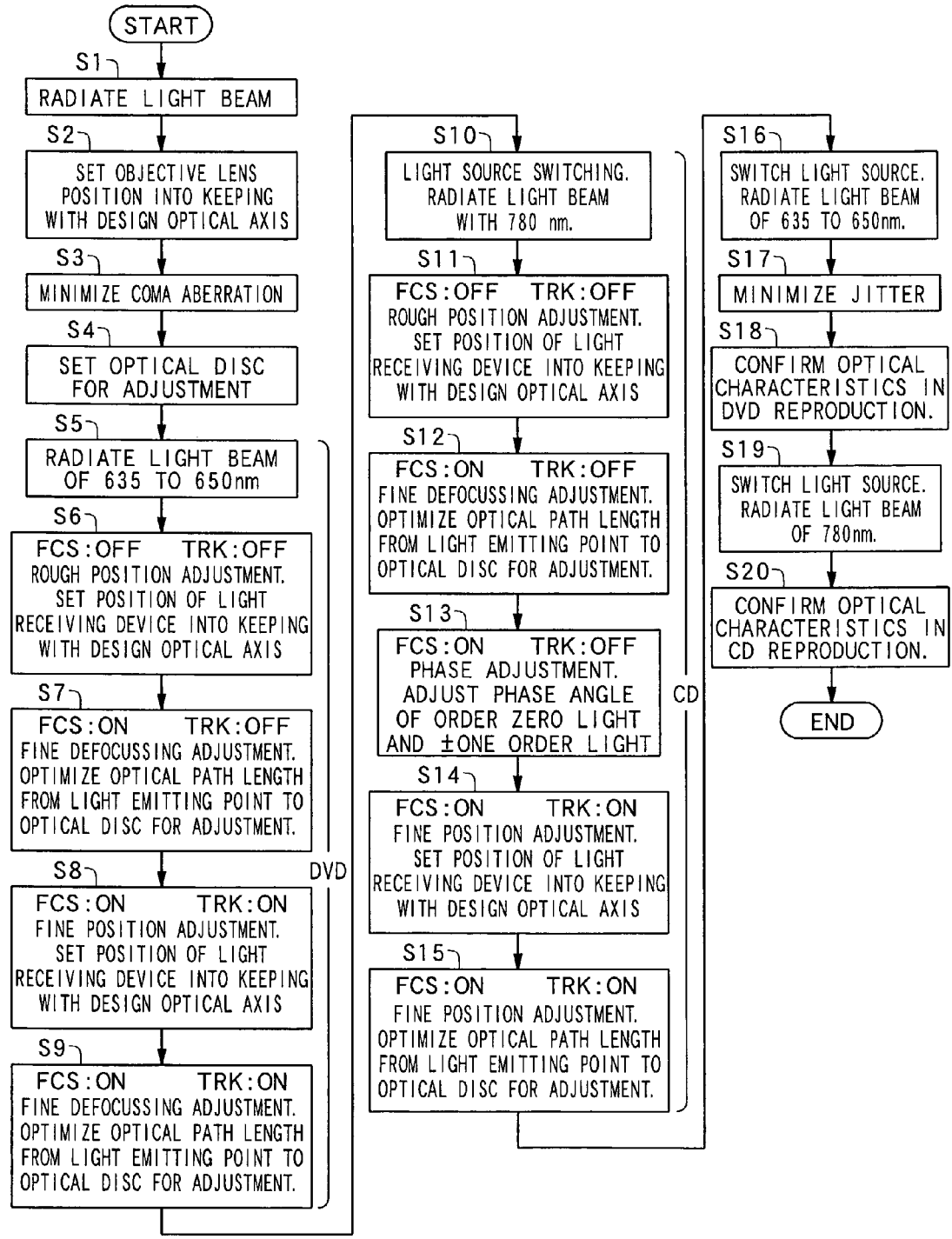
FIG. 5 is a flowchart for illustrating the method for adjustment of the optical pickup.

The adjustment mechanism 41 first adjusts the relative positions of the light source 12 and the objective lens 13. That is, in a step S1, the controller 56 controls the output controller 55 for radiating, from the light source 12, a light beam for a CD with a wavelength of 780 nm or a light beam for a DVD with a wavelength of 635 to 650 nm, as shown in FIG. 5. This causes the light source 12 to radiate the light beam for a CD with a wavelength of 780 nm or the light beam for a DVD with a wavelength of 635 to 650 nm. Meanwhile, the optical disc for adjustment 1 is not loaded at this time on the disc table 30 forming the disc rotation driving unit 25.

In a step S2, the controller 56 adjusts the objective lens 13 relative to the light source 12, that is adjusts the position of the objective lens 13 in meeting with the design optical axis. Specifically, the objective lens adjustment unit 42, holding the holder supporting in member 18, actuates, under control by the controller 56, the holding arms holding the holder supporting member 18, such as to cause movement of the objective lens 13 in a radial direction or X-direction and in a tangential direction or in the Y-direction, as well as movement of the light source adjustment unit 45, holding the light source 12, such that the center of the light source 12 will be coincident with the unmovable point on the optical axis of the objective lens 13. Thus, the adjustment mechanism 41 makes adjustment for shifting the positions of the light source 12 and the objective lens 13 for setting the position of the objective lens 13 into coincidence with the design optical axis.

In a step S3, the controller 56 performs the processing of minimizing the coma aberration. That is, the objective lens adjustment unit 42 actuates the holding arms holding the holder supporting member 18, under control by the controller 56, such as to adjust the radial skew and the tangential skew of the objective lens 13, in order to adjust the tilt of the objective lens 13 relative to the optical axis to minimize the coma aberration. That is, the CCD camera 48 of the detection unit 47 detects the light beam condensed by the objective lens 13. The controller 56 actuates the objective lens adjustment unit 42, in a controlled manner, based on the input from the coma aberration decision unit 49, for minimizing the coma aberration. When the coma aberration decision unit 49 has detected the minimum value of the coma aberration, the controller 56 actuates the objective lens adjustment unit 42 for maintaining the position of the objective lens 13, the coma aberration of which has been minimized.

In this manner, the optical pickup 11 is adjusted so that the position of the objective lens 13 is coincident with the design optical axis, while the tilt of the objective lens 13 is also adjusted for minimizing the coma aberration and the relative position between the light source 12 and the objective lens 13. The optical pickup 11 is then further adjusted for reproducing the DVD or the CD, that is, as to its relative position with respect to the objective lens 13, light source 12 and the photodetector 14.

In a step S4, the optical disc for adjustment 1 is loaded on the disc table 30, forming the disc rotation driving unit 25 provided on the base unit 21 set on the adjustment base block. The driving controller 53 actuates the driving motor 29, under control by the controller 56, so that the linear velocity of the optical disc for adjustment 1 at the time of rotation will be e.g., 3.49 m/sec as provided in the DVD standard. The optical disc for adjustment 1, loaded on the disc table 30, includes the first signal recording layer 5 for CD adjustment, the second signal recording layer 7 for DVD adjustment, and concentric recording tracks formed on each of the signal recording layers 5 and 7, as shown in FIGS. 1 to 3. In the optical disc for adjustment 1, shown in FIG. 2, the first recording area 8, provided on the first signal recording layer 5, and the second recording area 9, provided on the second signal recording layer 7, are overlapped at least partially with each other, whereas, in the optical disc for adjustment 1, shown in FIG. 3, the first recording area 8, provided on the first signal recording layer 5, and the second recording area 9, provided on the second signal recording layer 7, are not overlapped with each other. On the first signal recording layer 5, 8-14 modulated data, similar to those recorded on the CD, are recorded, whereas, on the second signal recording layer 7, there are recorded data for adjustment, which are data for adjustment for DVD but which are 8-14 modulated data.

Turning to adjustment of the optical pickup 11 in reproducing the DVD, when the optical disc for adjustment 1, shown in FIGS. 1 to 3, is loaded on the disc table 30, the optical pickup 11 is advanced by feed movement to the position of the second recording area 9 of the second signal recording layer 7 for DVD. That is, the controller 56 actuates the driving motor 29 by the driving controller 54 to cause movement of the optical pickup 11 to a readout enable position of the second recording area 9. The driving controller 53 actuates the driving motor 29 so that the linear velocity of the optical disc for adjustment 1 during rotation will be 3.49 m/sec as provided in for example the DVD standard.

In a step S5, the controller 56 controls the output controller 55 for radiating the light beam with a wavelength of 50 nm from the light source 12. This causes the light beam for DVD with a wavelength of 635 to 650 nm to be radiated from the light source 12. The photodetector 14 detects the return light beam reflected back from the optical disc for adjustment 1.

In a step S6, the adjustment mechanism 41 performs rough adjustment for setting the position of the photodetector 14 into coincidence with the design position on the optical axis. The controller 56 at this time controls the objective lens driving unit 16 such as to turn off both the focussing control and the tracking control. The light receiving unit holder 46, holding the photodetector 14 in this state, causes movement of the holding ants, holding the photodetector 14, under control by the controller 56, in order to perform rough adjustment for bringing the position of the photodetector 14 into approximate coincidence with the design position on the optical axis.

In a step S7, the adjustment mechanism 41 performs rough adjustment for optimizing the optical path length from the light source 12, that is the light emitting position, up to the optical disc for adjustment 1. At this time, the controller 56 turns the focussing control and the tracking control on and off, respectively, for focussing on the second signal recording layer 7. For this focussing, the astigmatic method, for example, is used. The controller 56 controls the objective lens adjustment unit 42, holding the objective lens 13, the light source adjustment unit 45, holding the light source 12, and the light receiving unit holder 46, holding the photodetector 14, to perform rough adjustment for optimizing the optical path length from the light emitting point up to the optical disc for adjustment 1.

In a step S8, the adjustment mechanism 41 performs rough adjustment for bringing the position of the photodetector 14 into alignment with the design position on the optical axis. At this time, the controller 56 controls the objective lens driving unit 16 so that both the focussing control and the tracking control will be turned on in order to permit the light beam to scan the concentric recording track as the light beam is focussed on the second signal recording layer 7. Meanwhile, the tracking control is by for example the push-pull method or by the DPD (differential phase detection) method. The photodetector adjustment unit 46, holding the photodetector 14 in this state, causes movement of the holding arms for the photodetector 14, under control by the controller 56, by way of performing fine adjustment of bringing the position of the photodetector 14 into coincidence with the design position on the optical axis.

In a step S9, the adjustment mechanism 41 performs fine adjustment of the optical path length from the light source 12, that is the light beam radiating point, up to the optical disc for adjustment 1. The controller 56 controls the objective lens driving unit 16 so that both the focussing control and the tracking control will be turned on in order to permit the light beam to scan the concentric recording track as the light beam is focussed on the second signal recording layer 7. The controller 56 controls the objective lens adjustment unit 42, holding the objective lens 13, the light source adjustment unit 45, holding the light source 12, and the light receiving unit holder 46, holding the photodetector 14, to perform fine adjustment for optimizing the optical path length from the light emitting point up to the optical disc for adjustment 1.

The adjustment mechanism 41 then performs adjustment of the optical pickup 11 in reproducing a CD. If the disc loaded on the disc table 30 is the optical disc for adjustment 1 shown in FIG. 2, that is the optical disc in which the first recording area 8 on the first signal recording layer 5 and the second recording area 9 of the second signal recording layer 7 are overlapped at least partially with each other, the controller 56 in a step S10 switches the light beam to be radiated. That is, the output controller 55 controls the light source 12 for radiating the light beam for a CD with a wavelength of 780 nm. The photodetector 14 receives the return light beam reflected back from the first signal recording layer 5 of the optical disc for adjustment 1. If the disc loaded on the disc table 30 is the optical disc for adjustment 1, the optical pickup 11, mounted on the slide member 23, is not advanced by feed movement.

If the disc loaded on the disc table 30 is the optical disc for adjustment 1 shown in FIG. 3, that is the optical disc in which the first recording area 8 on the first signal recording layer 5 and the second recording area 9 of the second signal recording layer 7 are not overlapped with each other, the slide member 23, having the optical pickup 11 mounted thereon, is advanced by feed movement, along the radius of the optical disc for adjustment 1, up to a position capable of reading the first recording area 8. The controller 56 then in the step S10 switches the light beam to be radiated. That is, the output controller 55 controls the light source 12 for radiating the light beam for a CD with a wavelength of 780 nm. The photodetector 14 receives the return light beam reflected back from the first signal recording layer 5 of the optical disc for adjustment 1.

The driving controller 53 actuates the driving motor 29, under control by the controller 56, so that the linear velocity of the optical disc for adjustment 1 will be 1.2 to 1.4 m/sec as provided in for example the CD standard.

In a step S11, the adjustment mechanism 41 performs rough adjustment for bringing the position of the photodetector 14 into coincidence with the design position on the optical axis. The controller 56 at this time controls the objective lens driving unit 16 such as to turn off both the focussing control and the tracking control. The light receiving unit holder 46, holding the photodetector 14 in this state, causes movement of the holding arms, holding the photodetector 14, under control by the controller 56, in order to perform rough adjustment for bringing the position of the photodetector 14 into coincidence with the design position on the optical axis.

In a step S12, the adjustment mechanism 41 performs rough adjustment for optimizing the optical path length from the light source 12, that is the light emitting position, up to the optical disc for adjustment 1. At this time, the controller 56 turns the focussing control and the tracking control on and off, respectively, for focussing the objective lens driving unit 16 on the second signal recording layer 7. For this focussing, the astigmatic method, for example, is used. The controller 56 controls the objective lens adjustment unit 42, holding the objective lens 13, the light source adjustment unit 45, holding the light source 12, and the light receiving unit holder 46, holding the photodetector 14, to perform rough adjustment for optimizing the optical path length from the light emitting point up to the optical disc for adjustment 1.

In a step S13, the adjustment mechanism 41 causes rotation of the light source 12, held by the light source holding arms of the light source adjustment unit 45, as the disc rotation driving unit 25 of the base unit 21 is actuated for rotationally driving the optical disc for adjustment 1. This adjusts the light beam so that, as the ± one order light of the light beam is rotated about the optical axis of the zero order light, forming three beams, so that the phase difference between the ± one order light will be 180°. The optical pickup 11 is now able to apply tracking servo, by the three-beam method, based on the output from the photodetector 14 of the ± one order light of the three beams by the signal detection unit 51. That is, the optical pickup 11 is able to apply tracking servo, so that the zero order light of the light beam will scan the concentric recording track of the optical disc for adjustment 1, based on the output signal of the photodetector 14 which has received the ± one order light.

In a step S14, the adjustment mechanism 41 performs fine adjustment for setting the position of the photodetector 14 into coincidence with the design position on the optical axis. The controller 56 controls the objective lens driving unit 16 so that both the focussing control and the tracking control will be turned on in order to permit the light beam to scan the concentric recording track as the light beam is focussed on the first signal recording layer 5. In this state, the photodetector adjustment unit 46, folding the photodetector 14, causes movement of the holding arms for the photodetector 14, under control by the photodetector 14, to execute fine adjustment of bringing the position of the photodetector 14 into coincidence with the design position on the optical axis.

In a step S15, the adjustment mechanism 41 performs fine adjustment of optimizing the optical path length from the light source 12, that is the light beam radiating point, up to the optical disc for adjustment 1. The controller 56 controls the objective lens driving unit 16 so that both the focussing control and the tracking control will be tuned on. The controller 56 controls the objective lens adjustment unit 42, holding the objective lens 13, the light source adjustment unit 45, holding the light source 12, and the light receiving unit holder 46, holding the photodetector 14, to perform fine adjustment for optimizing the optical path length from the light emitting point up to the optical disc for adjustment 1.

The adjustment mechanism 41 then proceeds to skew adjustment. Since the CD has an allowance for tilt larger than that of the DVD, this skew adjustment is made such as to satisfy the tilt allowance for DVD. It should be noted that, if the disc mounted on the disc table 30 is the optical disc for adjustment 1 shown in FIG. 2, that is an optical disc in which the first recording area 8 on the first signal recording layer and the second recording area 9 of the second signal recording layer 7 are overlapped at least partially with each other, the controller 56 in a step S16 switches the light beam to be radiated. That is, the output controller 55 controls the light source 12 for radiating the light beam for a DVD with a wavelength of 635 to 650 nm.

If the disc mounted on the disc table 30 is the optical disc for adjustment 1 shown in FIG. 3, that is an optical disc in which the first recording area 8 on the first signal recording layer 5 and the second recording area 9 of the second signal recording layer 7 are not overlapped with each other, the slide member 23, having the optical pickup 11 mounted thereon, is advanced in a direction along the radius of the optical disc for adjustment 1 up to a position capable of reading out the second recording area 9. The controller 56 then in a step S16 switches the light beam to be radiated. That is, the output controller 55 controls the light source 12 for radiating the light beam for a DVD with wavelength of 635 to 650 nm.

The driving controller 53 actuates the driving motor 29 so that the linear velocity of the optical disc for adjustment 1 during rotation will be 3.49 m/sec as provided in for example the DVD standard. In a step S17, the controller 56 actuates the objective lens adjustment unit 42 so that the jitter produced in the signal detection unit 51 will be of the least value.

In a step S18, the adjustment mechanism 41 confirms the optical characteristics in reproducing the DVD. For example, the adjustment mechanism 41 controls the output controller 55 so that the RF signal generated by the signal detection unit 51 by an output of the photodetector 14, which has detected the return light beam reflected back from the second signal recording layer 7, will be of an optimum value. The adjustment mechanism 41 also confirms the adjustment of the output level of the light source 12.

The adjustment mechanism 41 then performs adjustment of the optical pickup 11 in reproducing a CD. If the disc loaded on the disc table 30 is the optical disc for adjustment 1 shown in FIG. 2, that is the optical disc in which the first recording area 8 on the first signal recording layer 5 and the second recording area 9 of the second signal recording layer 7 are overlapped at least partially with each other, the controller 56 in the step S19 switches the light beam to be radiated. That is, the output controller 55 controls the light source 12 for radiating the light beam for a CD with a wavelength of 780 nm.

If the disc loaded on the disc table 30 is the optical disc for adjustment 1 shown in FIG. 3, that is the optical disc in which the first recording area 8 on the first signal recording layer 5 and the second recording area 9 of the second signal recording layer 7 are not overlapped with each other, the slide member 23, having the optical pickup 11 mounted thereon, is advanced by feed movement along the radius of the optical disc for adjustment 1 up to a position capable of reading the first recording area 8. The controller 56 then in a step S19 switches the light beam to be radiated. That is, the output controller 55 controls the light source 12 for radiating the light beam for a CD with a wavelength of 780 nm.

The driving controller 53 actuates the driving motor 29, under control by the controller 56, so that the linear velocity of the optical disc for adjustment 1 will be 1.2 to 1.4 m/sec as provided in for example the CD standard.

In a step S20, the adjustment mechanism 41 confirms optical characteristics in reproducing the DVD. For example, the adjustment mechanism 41 controls the output controller 55 so that the RF signal generated by the signal detection unit 51 by an output of the photodetector 14, which has detected the return light beam reflected back from the second signal recording layer 7, will be of an optimum value. The adjustment mechanism 41 also confirms the adjustment of the output level of the light source 12.

The adjustment mechanism 41, which has finished optical adjustment of the optical pickup 11, inspects e.g., an error rate of the optical pickup 11. The optical pickup 11, for which the optical adjustment has come to a close, is secured to the slide member 23 with an adhesive.

Since the adjustment of the optical pickup 11 employs the optical disc for adjustment 1, provided with the first signal recording layer 5 of the physical format for CD and with the second signal recording layer 7 of the physical format for DVD, the adjustment of the CD during reproduction and that of the DVD during reproduction can be achieved smoothly without exchanging the optical disc for adjustment as conventionally.

Since the concentric recording tracks are provided on both the first signal recording layer 5 and the second signal recording layer 7 of the optical disc for adjustment 1, there is no risk of the optical axis of the objective lens 13 being moved from the inner rim towards the outer rim of the optical disc for adjustment 1, with lapse of time, such that adjustment can be carried out as the optical axis of the objective lens 13 is coincident at all times with the center of the light beam.

Since the data of the same modulation system are recorded on the first signal recording layer 5 and the second signal recording layer 7 of the optical disc for adjustment 1, it is sufficient to provide the sole modulation unit 57 and the sole error correction unit 58 in the adjustment mechanism 41.

This optical disc for adjustment 1 is used for adjusting the optical pickup 11 usable for reproducing the CD and the DVD. Since it is not the 8-16 modulation used in DVD, but is the 8-14 modulation, used in CD, in which the number of bits after modulation is smaller than that in DVD, that is used as the modulation system for recording the data, it is possible to relieve the load imposed on demodulation processing.

If the optical disc loaded is the optical disc for adjustment 1 shown in FIG. 2, that is the optical disc in which the first recording area 8 on the first signal recording layer 5 and the second recording area 9 of the second signal recording layer 7 are overlapped at least partially with each other, it is unnecessary to advance the optical pickup 11 by feed movement, while it is only necessary to switch the sort of the light beam, when switching between the adjustment in reproducing the DVD and the adjustment in reproducing the CD, thus enabling smooth switching.

If the optical disc loaded is the optical disc for adjustment 1 shown in FIG. 3, that is an optical disc in which the first recording area 8 on the first signal recording layer 5 and the second recording area 9 of the second signal recording layer 7 are not overlapped with each other, data can be read out reliably when reproducing the first recording area 8 of the first signal recording layer 5.

The adjustment in reproducing the DVD in the aforementioned steps S5 to S9 or the adjustment in reproducing the CD in the steps S10 to S15 is not limited to that shown for example in FIG. 5, but the adjustment in reproducing the CD may be carried out after the adjustment in reproducing the DVD. The step of confirming the optical characteristics in reproducing the DVD in the step S18 may be interchanged with the step of confirming the optical characteristics in reproducing the CD in the step S20.

If the optical pickup 11 is formed by a laser coupler, the components except the objective lens 13 are unified together. Consequently, the adjustment to be performed at least in the steps S5 to S15 after the adjustment of the coma aberration in the steps S1 to S3 nay be omitted. That is, if the optical pickup 11 is formed by a laser coupler, it is only sufficient to carry out position adjustment of the objective lens.

Although the foregoing explanation has been made by taking an instance of adjustment of the optical pickup capable of reproducing both the CD and the DVD, the present invention is not limited to this configuration. That is, depending on the sort of the optical disc for which the optical pickup is used, the modulation system for recording data is determined, while the signal recording layer of the optical disc for adjustment 1 is determined by the physical format employed in the optical disc.

INDUSTRIAL APPLICABILITY

Since the optical disc for adjustment according to the present invention has at last two signal recording layers, and data modulated in accordance with the same modulation system are recorded in the respective signal recording layers with different physical formats, the optical pickup capable of recording and/or reproducing two or more sorts of optical discs may be adjusted in succession, without the necessity of exchanging the optical disc for adjustment, thus expediting the optical pickup adjustment process. Since the data of the same modulation system have been recorded in the respective signal recording layers, only one signal processing circuit suffices. In addition, since the recording tracks provided in the respective signal recording layers are concentric, there is no fear of the optical axis of the objective lens being moved from the inner rim towards the outer rim with lapse of time, with the consequence that adjustment may be carried out as the optical axis of the objective lens is coincident at all times with the center of the light beam.

On the other hand, according to the present invention, since the optical pickup capable of recording and/or reproducing two or more optical discs is recorded and/or reproduced using an optical disc for adjustment having at least two signal recording layers, in each of which data modulated in accordance with the same modulation system have been recorded concentrically with different physical formats, the optical pickup adjustment operations can be carried out in succession without exchanging the optical disc for adjustment as conventionally, thus expediting the optical pickup adjustment process.

Furthermore, according to the present invention, since the optical pickup capable of recording and/or reproducing two or more optical discs is recorded and/or reproduced using an optical disc for adjustment having at least two signal recording layers, in each of which data modulated in accordance with the same modulation system have been recorded concentrically with different physical formats, the optical pickup adjustment operations can be carried out in succession, without the necessity of exchanging the optical disc for adjustment, as conventionally, thus speeding up the optical pickup adjustment process.

The invention claimed is:

1. An adjustment apparatus for an optical pickup comprising:
   a disc rotating unit for rotationally driving an optical disc for adjustment mounted thereon, said optical disc being adapted for use in adjusting an optical pickup and having at least two signal recording layers, there being concentrically recorded in the respective signal recording layers data modulated in accordance with the same modulation system but with respective different physical formats;
   said optical pickup being configured for collecting a light beam radiated from a light source with an objective lens and for detecting a return light beam reflected back from said optical disc for adjustment by a photodetector, said optical pickup displacing said objective lens by an objective lens driving unit in a direction along an optical axis of said objective lens and in a direction perpendicular to said optical axis;
   adjustment means for adjusting relative positions of said light source and the objective lens and for adjusting a tilt of the optical axis of the objective lens;
   said adjustment means illuminating said light beam to one of said two signal recording layers of said optical disc for adjustment, arranged in a preset position relative to said optical disc for adjustment, for adjusting the relative positions of said light source and the objective lens, said objective lens driving unit displacing said objective lens along the optical axis thereof by said objective lens driving unit, said light beam being illuminated on another signal recording layer of the optical disc for adjustment in order to adjust the relative positions between said light source and the objective lens; and
   wherein the adjustment on the light beam that illuminates said one of the signal recording layers is carried out by rotationally adjusting said light source so that a phase difference of ± first order light, centered about zero order light, will be 180°, said zero order light and said ± first order light being illuminated from said optical pickup to said optical disc for adjustment.

2. The adjustment apparatus for an optical pickup according to claim 1 wherein
   a recording area of each of said two signal recording layers of said optical disc for adjustment, having data recorded therein, has, in a tracking controllable range by said objective lens, a trailing end of the signal recording area recorded on at least one of said two signal recording layers and a beginning end of a recording area of another signal recording layer, and wherein said adjustment means in said preset position relative to said optical disc for adjustment displacing said objective lens by said objective lens driving unit in a direction along the optical axis of said objective lens, said adjustment means also displacing said objective lens by said objective lens driving unit in a direction along the optical axis of said objective lens, said adjustment means illuminating said light beam to said other signal recording layer of said optical disc for adjustment for adjusting the relative position between said light source and the objective lens.

3. The adjustment apparatus for an optical pickup according to claim 1 wherein the recording areas of said two signal recording layers of said optical disc for adjustment, having data recorded thereon, are not overlapped with one another; there being provided, and further comprising movement means for causing movement of said optical pickup in a direction along a radius of said optical disc for adjustment;

said movement means causing movement of said optical pickup to a first position;

said adjustment means illuminating said light beam to one of said two signal recording layers of said optical disc for adjustment in said first position to adjust the relative positions of said light source and the objective lens; said movement means causing movement of said optical pickup to a second position different from said first position; said adjustment means illuminating said light beam to another signal recording layer of said optical disc for adjustment for adjusting the relative positions of said light source and the objective lens.

4. The adjustment apparatus for an optical pickup according to claim 1, wherein said adjustment means adjusts the tilt of the optical axis of said objective lens, based on the results of detection of the return light beam from said optical disc for adjustment of the light beam radiated from said optical pickup to said optical disc for adjustment, as the light beam radiated from the light source is post-scanning the recording track formed on said signal recording layer of said optical disc for adjustment after the end of said adjustment.

5. The adjustment apparatus for an optical pickup according to claim 4 wherein said adjustment means adjusts the tilt of the optical axis of the objective lens based on a value of jitter of a detection output signal which has detected the return light beam from the optical disc for adjustment of the light beam radiated from said optical pickup to said optical disc for adjustment.

6. The adjustment apparatus for an optical pickup according to claim 1 further comprising:

an imaging unit provided facing said optical pickup for imaging the light beam radiated from said light source;

said imaging unit detecting the light beam radiated from said optical pickup in a pre-stage before illuminating the light beam from said optical pickup to the signal recording layer of said optical disc for adjustment; said adjustment means performing rough adjustment for coma aberration based on detected results from said imaging unit.

7. The adjustment apparatus for an optical pickup according to claim 6 wherein said adjustment means performs adjustment as for the coma aberration and subsequently illuminates the light beam from said optical pickup to the signal recording layer of said optical disc for adjustment to adjust the relative positions of said light source and the objective lens based on the return light beam from said optical disc for adjustment.

8. An adjustment method for an optical pickup adjustment apparatus comprising:

a disc rotating unit for rotationally driving an optical disc for adjustment mounted thereon, said optical disc for adjustment being adapted for use in adjusting an optical pickup, said optical disc for adjustment having at least two signal recording layers, there being concentrically recorded in the respective signal recording layers data modulated in accordance with the same modulation system but with respective different physical formats; and said optical pickup f or collecting a light beam radiated from a light source with an objective lens, detecting a return light beam reflected back from said optical disc for adjustment by a photodetector, said optical pickup displacing said objective lens, by an objective lens driving unit, in a direction along an optical axis thereof and in a direction perpendicular to said optical axis;

said adjustment method comprising the steps of:

illuminating said light beam to one of said two signal recording layers of said optical disc for adjustment, in a preset position relative to said optical disc for adjustment, for adjusting the relative positions of said light source and the objective lens; and displacing said objective lens along the optical axis of said objective lens by said objective lens driving unit, said light beam being illuminated on another of said signal recording layers of the optical disc for adjustment in order to adjust the relative positions between said light source and the objective lens;

wherein the adjustment on the light beam that illuminates said one of the signal recording layers is carried out by rotationally adjusting said light source so that a phase difference of ± first order light, centered about zero order light, will be 180°, said zero order light and said ± first order light being illuminated from said optical pickup to said optical disc for adjustment.

9. The adjustment apparatus for an optical pickup according to claim 8 further comprising:

an imaging unit provided facing said optical pickup for imaging the light beam radiated from said light source;

said imaging unit detecting the light beam radiated from said optical pickup in a pre-stage before illuminating the light beam from said optical pickup to the signal recording layer of said optical disc for adjustment; said adjustment means performing rough adjustment for coma aberration based on detected results from said imaging unit.

10. The adjustment apparatus for an optical pickup according to claim 9, wherein said adjustment means performs adjustment as for the coma aberration and subsequently illuminates the light beam from said optical pickup to the signal recording layer of said optical disc for adjustment to adjust the relative positions of said light source and the objective lens based on the return light beam from said optical disc for adjustment.

11. An apparatus for adjusting an optical pickup comprising:

an optical pickup having a light source for radiating a light beam of a first wavelength and a light beam of a second wavelength, an objective lens for collecting and radiating said light beam for an optical disc for adjustment having tracks formed concentrically in at least two signal recording layers with signals modulated in accordance with the same modulation system, but with respective different physical formats, a photodetector for detecting reflected light from said optical disc for adjustment of the illuminated light beam, and a driving unit for actuating said objective lens in the focussing direction and in the tracking direction in a controlled manner; and an adjustment unit for adjusting relative positions of said light source and the objective lens and for adjusting a tilt of the optical axis of said objective lens;

said adjustment unit executing a first adjustment for adjusting the relative positions of said light source and the objective lens when the light beam of said first wavelength is illuminated on one of the two signal recording layers of said optical disc for adjustment and focussing control is performed by said driving unit;

said adjustment unit executing a second adjustment for adjusting the relative positions of said light source and the objective lens when the light beam of said second wavelength is illuminated on the other of the signal recording layers of said optical disc for adjustment and focussing control is performed by said driving unit;

wherein the adjustment on the light beam that illuminates said one of the signal recording layers is carried out by rotationally adjusting said light source so that a phase difference of ± first order light, centered about zero order light, will be 180°, said zero order light and said ± first order light being illuminated from said optical pickup to said optical disc for adjustment.

12. The apparatus for adjusting an optical pickup according to claim 11 further comprising:

a rotational driving unit for rotationally driving said optical disc for adjustment at a first linear velocity and at a second linear velocity;

said rotational driving unit rotationally driving said optical disc for adjustment at said first linear velocity and at said second linear velocity for said first adjustment and for said second adjustment, respectively.

13. The apparatus for adjusting an optical pickup according to claim 11 further comprising:

an imaging unit mounted facing said optical pickup for imaging a light beam radiated from said light source;

said adjustment unit sets the position of said objective lens into agreement with the predetermined optical axis, in a state in which said first adjustment of adjusting the relative position between said light source and the objective lens has been made, said adjustment unit effecting rough adjustment of the coma aberration, based on the light beam radiated by said optical pickup so as to be detected by said imaging unit.

14. The apparatus for adjusting an optical pickup according to claim 11 wherein said adjustment unit adjusts the tilt of the optical axis of said objective lens, based on an output of said photodetector, in a state in which said second adjustment has been made and in which the light beam radiated from the light source is post-scanning the recording track formed on said signal recording layer of said optical disc for adjustment.

15. The apparatus for adjusting an optical pickup according to claim 14 wherein said adjustment unit adjusts the tilt of the optical axis of said objective lens based on a value of jitter of an output signal of said photodetector.

16. The apparatus for adjusting an optical pickup according to claim 11 wherein, in said first adjustment, when said focussing control and said tracking control by said driving unit are turned off, said adjustment unit effects rough adjustment of setting the position of said photodetector into agreement with the design optical axis; when said driving unit turns on said focussing control, said adjustment unit effects rough adjustment of the relative positions of said light source and the objective lens; when said driving unit turns on said tracking control, said adjustment unit effects fine adjustment of setting a position of said photodetector into agreement with a predetermined optical axis to effect fine adjustment of the relative positions between said light source and the objective lens; and wherein, in said second adjustment, when said focussing control and said tracking control by said driving unit are turned off, said adjustment unit effects rough adjustment of setting the position of said photodetector into agreement with the predetermined optical axis; when said driving unit turns on said focussing control, said adjustment unit effects rough adjustment of the relative positions of said light source and the objective lens, and effects rotational adjustment of said light source so that a phase difference about a zero order light as center of the ± first order light, illuminated from said optical pickup to said optical disc for adjustment along with said zero order light, will be 180°; when said driving unit turns on said tracking control, said adjustment unit effects fine adjustment of setting the position of said photodetector into agreement with the predetermined optical axis to effect fine adjustment of the relative positions of said light source and the objective lens.

* * * * *